US012738292B2

(12) United States Patent
Kong et al.

(10) Patent No.: US 12,738,292 B2
(45) Date of Patent: Sep. 15, 2026

(54) METHOD AND APPARATUS FOR SEPARATING AUDIO SIGNAL, DEVICE, STORAGE MEDIUM, AND PROGRAM

(71) Applicant: Lemon Inc., Grand Cayman (KY)

(72) Inventors: Qiuqiang Kong, Beijing (CN); Haohe Liu, Beijing (CN)

(73) Assignee: Lemon Inc., Grand Cayman (KY)

(*) Notice: Subject to any disclaimer, the term of this patent is extended or adjusted under 35 U.S.C. 154(b) by 65 days.

(21) Appl. No.: 18/570,923

(22) PCT Filed: Aug. 18, 2022

(86) PCT No.: PCT/SG2022/050588
§ 371 (c)(1),
(2) Date: Dec. 15, 2023

(87) PCT Pub. No.: WO2023/027634
PCT Pub. Date: Mar. 2, 2023

(65) Prior Publication Data

US 2024/0282329 A1 Aug. 22, 2024

(30) Foreign Application Priority Data

Aug. 27, 2021 (CN) ......................... 202110993553.1

(51) Int. Cl.
*G10L 21/0308* (2013.01)
*G06N 3/0464* (2023.01)
(Continued)

(52) U.S. Cl.
CPC ........ *G10L 21/0308* (2013.01); *G06N 3/0464* (2023.01); *G10L 25/18* (2013.01); *G10L 25/30* (2013.01)

(58) Field of Classification Search
CPC ........ G06N 20/00; G06N 3/0464; G06N 3/08; G06N 3/0475; G06N 3/094; G10H 1/361;
(Continued)

(56) References Cited

U.S. PATENT DOCUMENTS 10,529,349 B2 * 1/2020 Le Roux ................. G10L 19/06
2014/0247947 A1 9/2014 Yoshizawa et al.
(Continued)

FOREIGN PATENT DOCUMENTS

CN 107077860 A 8/2017
CN 109584903 A 4/2019
(Continued)

OTHER PUBLICATIONS

ISA Intellectual Property Office of Singapore, International Search Report Issued in Application No. PCT/SG2022/050588, Mar. 1, 2023, WIPO, 4 pages.

*Primary Examiner* — Fan S Tsang
*Assistant Examiner* — Sean Rinehart
(74) *Attorney, Agent, or Firm* — Alleman Hall LLP

(57) ABSTRACT

Provided in the embodiments of the present disclosure are an audio signal separation method and apparatus, a device, an electronic device, a computer-readable storage medium, a computer program product, and a computer program. The method comprises: determining first amplitude information of a mixed audio signal to be processed, and first phase information of the mixed audio signal; processing the first amplitude information to obtain amplitude difference information and phase difference information between the mixed audio signal and a first audio signal, wherein the first audio signal is a pure audio signal corresponding to a first sound source in the mixed audio signal; and according to the first amplitude information, the first phase information, the amplitude difference information, and the phase difference
(Continued)

information, determining the first audio signal. By means of the described process, the audio separation effect can be improved.

20 Claims, 8 Drawing Sheets

(51) Int. Cl.
*G10L 25/18* (2013.01)
*G10L 25/30* (2013.01)

(58) Field of Classification Search
CPC ......... G10H 2210/00; G10H 2210/031; G10H 2210/056; G10H 2210/076; G10H 2210/131; G10H 2250/311; G10L 15/063; G10L 19/008; G10L 19/02; G10L 21/0272; G10L 21/028; G10L 21/0308; G10L 21/0316; G10L 25/18; G10L 25/30; G10L 25/84; G10L 21/02; G10L 21/18; G10L 21/30; G10L 21/03; G10L 21/00; G10L 21/51; G06F 3/165
USPC ........................................................... 700/94
See application file for complete search history.

(56) References Cited

U.S. PATENT DOCUMENTS

2017/0178666 A1* 6/2017 Yu ........................... G10L 15/16
2018/0122403 A1* 5/2018 Koretzky .............. G10L 21/028
2021/0012767 A1 1/2021 Kupryjanow et al.
2021/0035590 A1* 2/2021 Miner ...................... G06N 3/09
2021/0120355 A1* 4/2021 Kim .......................... H04S 5/00
2024/0161766 A1* 5/2024 Sun ........................ G06N 3/084

FOREIGN PATENT DOCUMENTS

CN 110503976 A 11/2019
CN 111128214 A 5/2020
CN 111192594 A 5/2020
CN 111540374 A 8/2020
CN 111724807 A 9/2020
CN 111899756 A 11/2020
CN 111968669 A * 11/2020 ............. G10L 25/30
CN 112331218 A 2/2021
CN 112567458 A 3/2021
CN 113099336 A 7/2021
KR 1020110127783 A 11/2011

* cited by examiner

REB

| Pooling layer 2×2 |
| --- |
| RCB |
| RCB |
| RCB |
| RCB |

RDB

| RCB |
| --- |
| RCB |
| RCB |
| RCB |
| Transposed convolutional layer |

METHOD AND APPARATUS FOR SEPARATING AUDIO SIGNAL, DEVICE, STORAGE MEDIUM, AND PROGRAM

CROSS-REFERENCE TO RELATED APPLICATION(S)

The application is a U.S. National Stage Application of PCT Application Serial No. PCT/SG2022/050588, filed Aug. 18, 2022, which claims the priority to Chinese Patent Application No. 202110993553.1, filed on Aug. 27, 2021 and entitled "Audio Signal Separation Method and Apparatus, Device, Storage Medium, And Program", the disclosures of which are incorporated herein in their entireties by reference.

FIELD

Examples of the present disclosure relate to the field of artificial intelligence, in particular, to a method and apparatus for separating an audio signal, a device, an electronic device, a computer-readable storage medium, a computer program product and a computer program.

BACKGROUND

Audio signal separation is a technology for separating pure audio signals of a single audio source from mixed audio signals. Taking music source separation (MSS) for an example, audio signal separation can be used to separate a voice, a drum sound and a bass sound from a piece of music.

In the related art, audio signal separation can adopt the following manner. Taking a first audio source as an example, an audio source separation model corresponding to the first audio source is pre-trained, and the audio source separation model is configured to predict an amplitude of a pure audio signal corresponding to the first audio source according to a mixed audio signal. When an audio signal is separated, a mixed audio signal is input into the audio source separation model to obtain a predicted amplitude. The predicted amplitude is taken as an amplitude of a pure audio signal corresponding to the first audio source, and a phase of the mixed audio signal is taken as a phase of the pure audio signal corresponding to the first audio source, thereby obtaining the pure audio signal corresponding to the first audio source.

However, the inventor finds that in related art, the pure audio signal separated by the conventional method is distorted, resulting in to a poor separation effect.

SUMMARY

Examples of the present disclosure provide a method and apparatus for separating an audio signal, a device, an electronic device, a computer-readable storage medium, a computer program product and a computer program for improving a separation effect of an audio signal.

In a first aspect, an example of the present disclosure provides a method for separating an audio signal. The method includes:

determining first amplitude information of a mixed audio signal to be processed and first phase information of the mixed audio signal, wherein the mixed audio signal is formed by mixing pure audio signals corresponding to a plurality of audio sources;

processing the first amplitude information and obtaining amplitude difference information and phase difference information between the mixed audio signal and a first audio signal, wherein the first audio signal is a pure audio signal corresponding to a first audio source in the mixed audio signal; and determining the first audio signal according to the first amplitude information, the first phase information, the amplitude difference information and the phase difference information.

In a second aspect, the example of the present disclosure provides an apparatus for separating an audio signal. The apparatus includes:

a first determination module configured to determine first amplitude information of a mixed audio signal to be processed and first phase information of the mixed audio signal, wherein the mixed audio signal is formed by mixing pure audio signals corresponding to a plurality of audio sources;

a processing module configured to process the first amplitude information and obtain amplitude difference information and phase difference information between the mixed audio signal and a first audio signal, wherein the first audio signal is a pure audio signal corresponding to a first audio source in the mixed audio signal; and a second determination module configured to determine the first audio signal according to the first amplitude information, the first phase information, the amplitude difference information and the phase difference information.

In a third aspect, the example of the present disclosure provides an electronic device. The electronic device includes: a processor and a memory;

the memory stores computer-executable instructions; and the processor executes the computer-executable instructions, so as to implement the method in any possible design in the first aspect and the second aspect.

In a fourth aspect, the example of the present disclosure provides a computer-readable storage medium. The computer-readable storage medium stores computer-executable instructions, where the computer-executable instructions implement the method in any possible design in the first aspect and the second aspect.

In a fifth aspect, the example of the present disclosure provides a computer program product. The computer program product includes a computer program, where the computer program implements the method in any possible design in the first aspect and the second aspect when executed by a processor.

In a sixth aspect, the example of the present disclosure provides a computer program. The computer program implements the method in any possible design in the first aspect and the second aspect when executed by a processor.

Embodiments of the present disclosure provide a method and an apparatus for separating an audio signal, a device, an electronic device, a computer-readable storage medium, a computer program product and a computer program. The method includes: determining the first amplitude information of the mixed audio signal to be processed and the first phase information of the mixed audio signal; processing the first amplitude information and obtaining the amplitude difference information and the phase difference information between the mixed audio signal and the first audio signal, wherein the first audio signal is the pure audio signal corresponding to the first audio source in the mixed audio signal; and determining the first audio signal according to the first amplitude information, the first phase information, the amplitude difference information and the phase difference information. In the process described above, the first amplitude information is processed, such that the amplitude difference information and the phase difference information between the mixed audio signal and the first audio signal can be predicted separately, accuracy of the amplitude information and the phase information of the first audio signal is guaranteed, distortion of the first audio signal is avoided, and the audio separation effect is improved.

BRIEF DESCRIPTION OF THE DRAWINGS

To describe technical solutions according to embodiments of the present disclosure or in the prior art more clearly, accompanying drawings required in descriptions of the embodiments or in the prior art will be briefly described below. Apparently, the accompanying drawings in the following descriptions show some embodiments of the present disclosure, and a person of ordinary skill in the art may still derive other accompanying drawings from these accompanying drawings without creative efforts.

DETAILED DESCRIPTION OF EMBODIMENTS

To make objectives, technical solutions, and advantages of embodiment of the present disclosure clearer, the technical solutions according to embodiments of the present disclosure will be clearly and completely described below with reference to accompanying drawings according to embodiments of the present disclosure. Apparently, the described embodiments are some examples rather than all examples of the present disclosure. All other examples derived by a person of ordinary skill in the art from embodiments of the present disclosure without creative efforts shall fall within the protection scope of the present disclosure.

In an embodiment of the present disclosure, an audio source means an audio origin. For example, a piece of music may correspond to multiple audio sources, including but not limited to: a voice, a drum sound, a bass sound and a piano sound.

Embodiments of the present disclosure may be applied to a scenario where a pure audio signal corresponding to a single audio source is separated from a mixed audio signal, including music source separation (MSS). The music source separation is an important subject of music information retrieval (MIR), and may be used for MIR tasks including but not limited to melody extraction, pitch estimation, music transcription, music mixing, etc. Music source separation also has some direct applications, such as karaoke and music mixing. For the convenience of understanding, an application scenario of an embodiment of the present disclosure is introduced below with the MSS as an example.

Figures 1, 2:
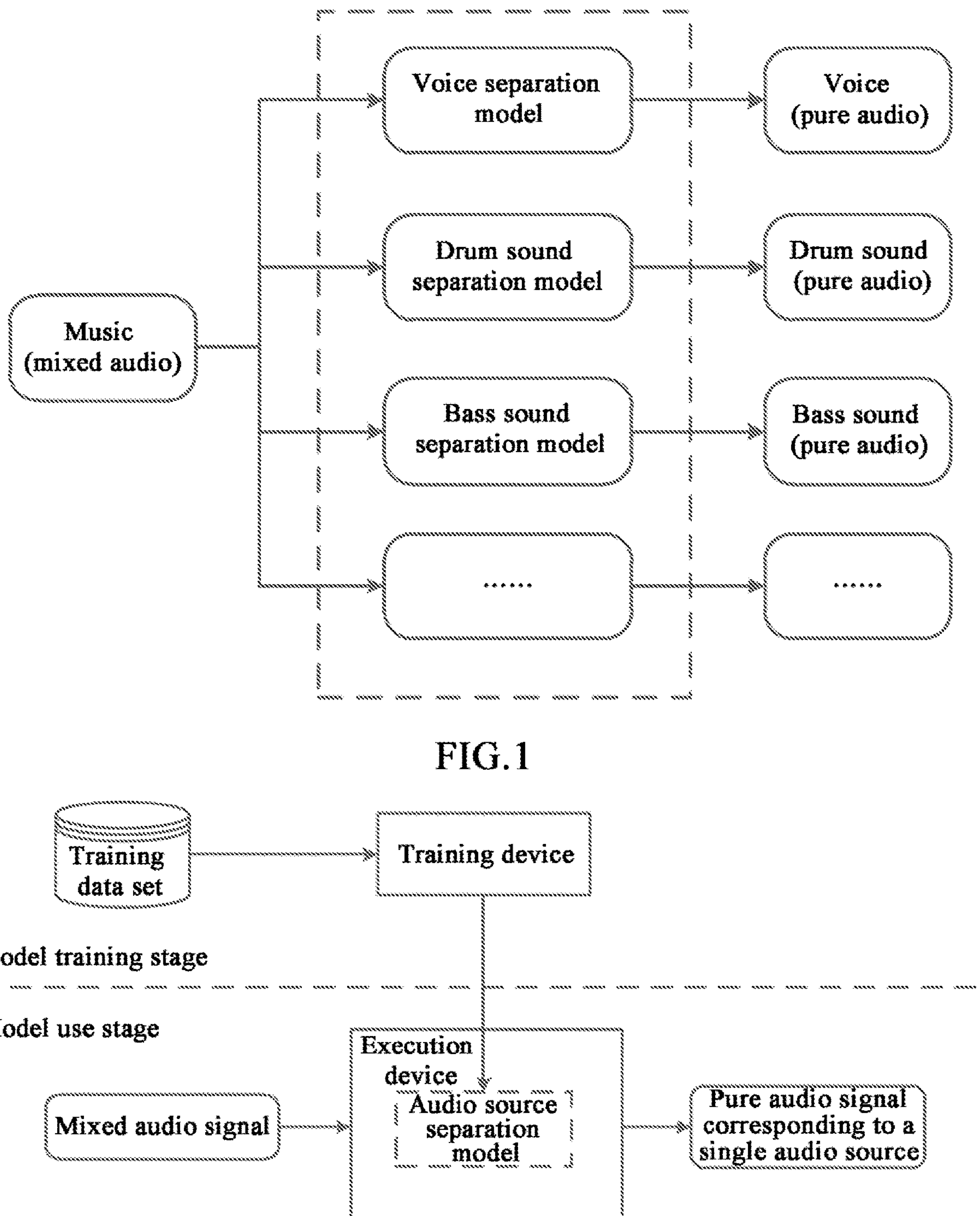
FIG. 1 is a schematic diagram showing music source separation according to an embodiment of the present disclosure.
FIG. 2 is a schematic diagram of a system architecture according to an embodiment of the present disclosure.

FIG. 1 is a schematic diagram showing music source separation according to an embodiment of the present disclosure. A piece of music is usually obtained by mixing audio signals generated by different audio sources (including a voice, a drum sound and a bass sound). In this embodiment, music may be referred to as a mixed audio signal, and an audio signal generated by each type of audio source may be referred to as a pure audio signal corresponding to the audio source. With reference to FIG. 1, when a music source is separated, a pure audio signal corresponding to each audio source may be separated from music by using audio source separation models corresponding to different audio sources. For example, a voice may be separated from the music by using a voice separation model, the drum sound may be separated from the music by using a drum sound separation model, and the bass sound may be separated from the music by using a bass sound separation model.

FIG. 2 is a schematic diagram of a system architecture according to an embodiment of the present disclosure. As shown in FIG. 2, the system architecture includes a training device and an execution device.

The training device may learn multiple training samples in a training data set and obtain an audio source separation model through modeling. Illustratively, the multiple training samples may be constructed, and each training sample includes a mixed audio signal and a pure audio signal corresponding to a first audio source in the mixed audio signal. By learning the multiple training samples, the audio source separation model is obtained with a capacity to separate the pure audio signal of the first audio source.

The audio source separation model trained by the training device is deployed into the execution device. When audio separation is to be performed, a mixed audio signal to be processed is input into the execution device. The execution device outputs the pure audio signal corresponding to the first audio source. During a process performed by the execution device, the audio source separation model described above may be used.

In the system architecture shown in FIG. 2, the training device is generally a server. The execution device may be a terminal device or a server. The terminal device includes, but is not limited to, a smart phone, a tablet computer, a laptop, a smart television, a smart wearable device, a smart speaker, an audio processing device, etc. It should be noted that the system architecture described above is merely some possible examples, and should not be used as limitation to the example of the present disclosure. In some application scenarios, the training device and the execution device may be separate electronic devices. In some other application scenarios, the training device and the execution device may be the same electronic device.

In one possible implementation manner, audio signal separation may be performed in the following manner. Taking a first audio source as an example, an audio source separation model corresponding to the first audio source is pre-trained, and the audio source separation model is configured to predict amplitude information of a pure audio signal corresponding to the first audio source according to a mixed audio signal. When the audio signal is separated, the mixed audio signal is input into the audio source separation model to obtain predicted amplitude information. The predicted amplitude information is taken as the amplitude information of the pure audio signal corresponding to the first audio source, and phase information of the mixed audio signal is taken as phase information of the pure audio signal corresponding to the first audio source, thereby the pure audio signal corresponding to the first audio source is obtained.

In another possible implementation manner, audio signal separation may be performed in the following manner. Taking a first audio source as an example, an audio source separation model corresponding to the first audio source is pre-trained, and the audio source separation model is configured to predict amplitude difference information between a mixed audio signal and a pure audio signal corresponding to the first audio source in the mixed audio signal. When the audio signal separation is performed, the mixed audio signal is input into the audio source separation model to obtain the amplitude difference information, and amplitude information of the pure audio signal corresponding to the first audio source is determined according to the amplitude information of the mixed audio signal and the amplitude difference information.

Specifically, the amplitude difference information is represented by an ideal ratio mask (IRM). The IRM is expresses as $\hat{M}$, and the pure audio signal corresponding to the first audio source may be obtained in the following manner:

$$|\hat{S}| = |\hat{M}| \odot |X|$$

Wherein, $|X|$ denotes the amplitude information of the mixed audio signal and $|\hat{S}|$ denotes the amplitude information of the pure audio signal corresponding to the first audio source. In the case that the IRM is used, a value range of $\hat{M}$ is [0,1], that is, it is assumed that an amplitude of the pure audio signal of a single audio source is less than an amplitude of the mixed audio signal.

Further, phase information of the mixed audio signal is taken as phase information of the pure audio signal corresponding to the first audio source, and the pure audio signal corresponding to the first audio source is obtained.

However, the inventor found during research that pure audio signals separated according to the two above implementation manners are distorted, resulting into a poor separation effect. Through research and analysis of the technical problems described above, the inventor finds that in an actual application, the mixed audio signal is obtained by mixing pure audio signals corresponding to various audio sources, and phases of pure audio signals corresponding to different audio sources may be different from one another. In the two implementation manners described above, the phase of the mixed audio signal is directly taken as the phase of the pure audio signal corresponding to the first audio source, such that inaccuracy of the phase of the pure audio signal corresponding to the first audio source may be caused, a problem that the pure audio signal corresponding to the first audio source is distorted is caused, and the separation effect is affected.

Embodiments of the present disclosure provide a method and apparatus for separating an audio signal, a device, an electronic device, a computer-readable storage medium, a computer program product and a computer program. When the mixed audio signal is separated, by processing the amplitude information of the mixed audio signal, not only the amplitude difference information between the mixed audio signal and the pure audio signal corresponding to the first audio source may be predicted, but also the phase difference information between the mixed audio signal and the pure audio signal corresponding to the first audio source may be further predicted. In this way, the pure audio signal corresponding to the first audio source may be determined based on the amplitude information of the mixed audio signal, the phase information of the mixed audio signal, the amplitude difference information, and the phase difference information that are predicted.

During the process described above, since the amplitude difference information and the phase difference information between the mixed audio signal and the pure audio signal corresponding to the first audio signal are predicted simultaneously, and accuracy of the amplitude information and the phase information of the pure audio signal corresponding to the first audio source is guaranteed, distortion of the pure audio signal corresponding to the first audio source is avoided, and the audio separation effect is improved accordingly.

The technical solution of the present disclosure will be described below in detail with reference to specific embodiments. Several specific embodiments below may be combined with one another, and the same or similar concepts or processes may not be repeated in some embodiments.

Figures 3, 4:
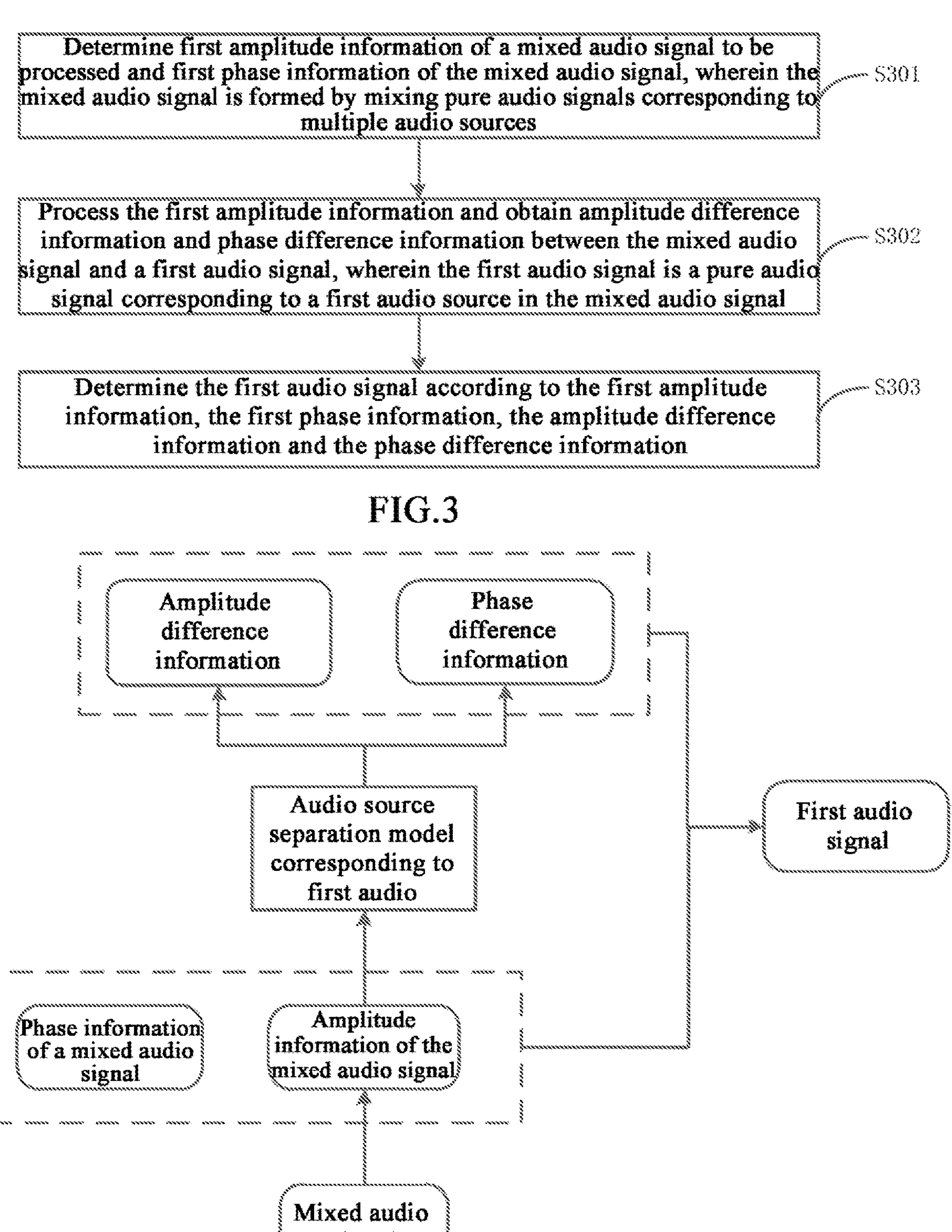
FIG. 3 is a schematic flowchart of a method for separating an audio signal according to an embodiment of the present disclosure.
FIG. 4 is a schematic diagram of a process of separating an audio signal according to an embodiment of the present disclosure.

FIG. 3 is a schematic flowchart of a method for separating an audio signal according to an embodiment of the present disclosure. As shown in FIG. 3, the method according to this example include:

S301: First amplitude information of a mixed audio signal to be processed and first phase information of the mixed audio signal are determined, wherein the mixed audio signal is formed by mixing pure audio signals corresponding to multiple audio sources.

In an embodiment of the present disclosure, the mixed audio signal is an audio signal to be separated, and the mixed audio signal includes pure audio signals corresponding to multiple audio sources. For example, the mixed audio signal is a piece of music.

In a possible implementation manner, Fourier transform is performed on the mixed audio signal to be processed to obtain a frequency domain signal corresponding to the mixed audio signal. Amplitude information corresponding to the mixed audio signal and phase information corresponding to the mixed audio signal are determined based on the frequency domain signal corresponding to the mixed audio signal. In this embodiment, the amplitude information of the mixed audio signal is referred to as “the first amplitude information” and the phase information of the mixed audio signal is referred to as “the first phase information” for a purpose of brevity in the following description.

In an actual application, a duration of the mixed audio signal to be separated may be relatively long. For example, a duration of a piece of music is usually 3 minutes-5 minutes. In a possible implementation manner, the mixed audio signal may be segmented according to a preset duration (for example, 1 second, 3 seconds, or 5 seconds) to obtain multiple segments. Each segment is taken as a mixed audio signal to be processed. The first amplitude information and the first phase information are determined by performing short-time Fourier transform on the segment. In addition, the method for separating an audio signal according to the embodiment is used for separation. Alternatively, different segments may be executed in parallel. In this way, processing efficiency of audio separation can be improved.

S302: The first amplitude information is processed to obtain amplitude difference information and phase difference information between the mixed audio signal and a first audio signal, wherein the first audio signal is a pure audio signal corresponding to a first audio source in the mixed audio signal.

Embodiments of the present disclosure is described with an example of separation of the pure audio signal corresponding to the first audio source from the mixed audio signal. The first audio source may be any audio source of multiple audio sources included in the mixed audio signal. For convenience of description, in this embodiments, the pure audio signal corresponding to the first audio source in the mixed audio signal is referred to as "the first audio source signal".

In one possible implementation manner, a machine learning model obtained through pre-training may be used for separating an audio. In the embodiment of the present disclosure, the machine learning model is used as an audio source separation model. The audio source separation model may be obtained by learning multiple training samples. Each training sample includes amplitude information of a sample mixed audio signal, and amplitude difference information and phase difference information between the sample mixed audio signal and a sample pure audio signal. The sample pure audio signal is the pure audio signal corresponding to the first audio source in the sample mixed audio signal.

FIG. 4 is a schematic diagram of a process of separating an audio signal according to an embodiment of the present disclosure. As shown in FIG. 4, the first amplitude information (that is, amplitude information of a mixed audio signal) is input into an audio source separation model corresponding to a first audio source. The audio source separation model processes the mixed audio signal to obtain amplitude difference information and phase difference information. The amplitude difference information indicates an amplitude difference between the mixed audio signal and a pure audio signal corresponding to the first audio source, and the phase difference information indicates a phase difference between the mixed audio signal and the pure audio signal corresponding to the first audio source.

It should be noted that in the embodiment of the present disclosure, a difference between A and B should not be understood narrowly as a difference between A and B. The difference between A and B may be reflected in various relationships, for example, a relation between A and B may be a multiple, linear, nonlinear, or any other relation that may reflect the relationship between A and B.

In this embodiment, through the audio source separation model corresponding to the first audio source, not only the amplitude difference information between the mixed audio signal and the first audio signal may be predicted, but also the phase difference information between the mixed audio signal and the first audio signal may be predicted. Compared with the foregoing implementation manner in which phase information of the mixed audio signal is directly taken as phase information of the first audio signal, accuracy of phase information of the first audio signal is improved.

In this embodiment, the audio source separation model corresponding to the first audio source is pre-trained through a machine learning method. In this embodiment, a specific structure and a training manner of the audio source separation model are not described in detail, for which reference can be made to detailed description of a subsequent embodiment.

S303: The first audio signal is determined according to the first amplitude information, the first phase information, the amplitude difference information, and the phase difference information.

With further reference to FIG. 4, since the audio source separation model corresponding to the first audio source predicts the amplitude difference information and the phase difference information between the mixed audio signal and the first audio signal, the first audio signal may be determined according to the first amplitude information, the first phase information, the amplitude difference information, and the phase difference information.

In a possible implementation manner, second amplitude information is determined according to the first amplitude information and the amplitude difference information. The second amplitude information may be regarded as amplitude information of the first audio signal. According to the first phase information and the phase difference information, the second phase information is determined. The second phase information may be regarded as phase information of the first audio signal. In this way, the first audio signal may be determined according to the second amplitude information and the second phase information.

Specifically, the second amplitude information is used as the amplitude information of the first audio signal, the second phase information is used as the phase information of the first audio signal, a frequency domain signal corresponding to the first audio signal is obtained, and inverse Fourier transform is performed on the frequency domain signal corresponding to the first audio signal to obtain the first audio signal.

The method for separating an audio signal according to this embodiment includes: the first amplitude information of the mixed audio signal to be processed and the first phase information of the mixed audio signal are determined. The first amplitude information is processed to obtain the amplitude difference information and the phase difference information between the mixed audio signal and the first audio signal. The first audio signal is the pure audio signal corresponding to the first audio source in the mixed audio signal. The first audio signal is determined according to the first amplitude information, the first phase information, the amplitude difference information, and the phase difference information. In the process described above, the amplitude difference information and the phase difference information between the mixed audio signal and the first audio signal can be predicted separately through the audio source separation model corresponding to the first audio source. Accuracy of the amplitude information and the phase information of the first audio signal is guaranteed at the same time, such that distortion of the first audio signal is avoided, and the audio separation effect is improved.

On the basis of the embodiment described above, the method for separating an audio signal provided by the present disclosure will be described in more detail below with reference to a more specific example.

Figure 5:
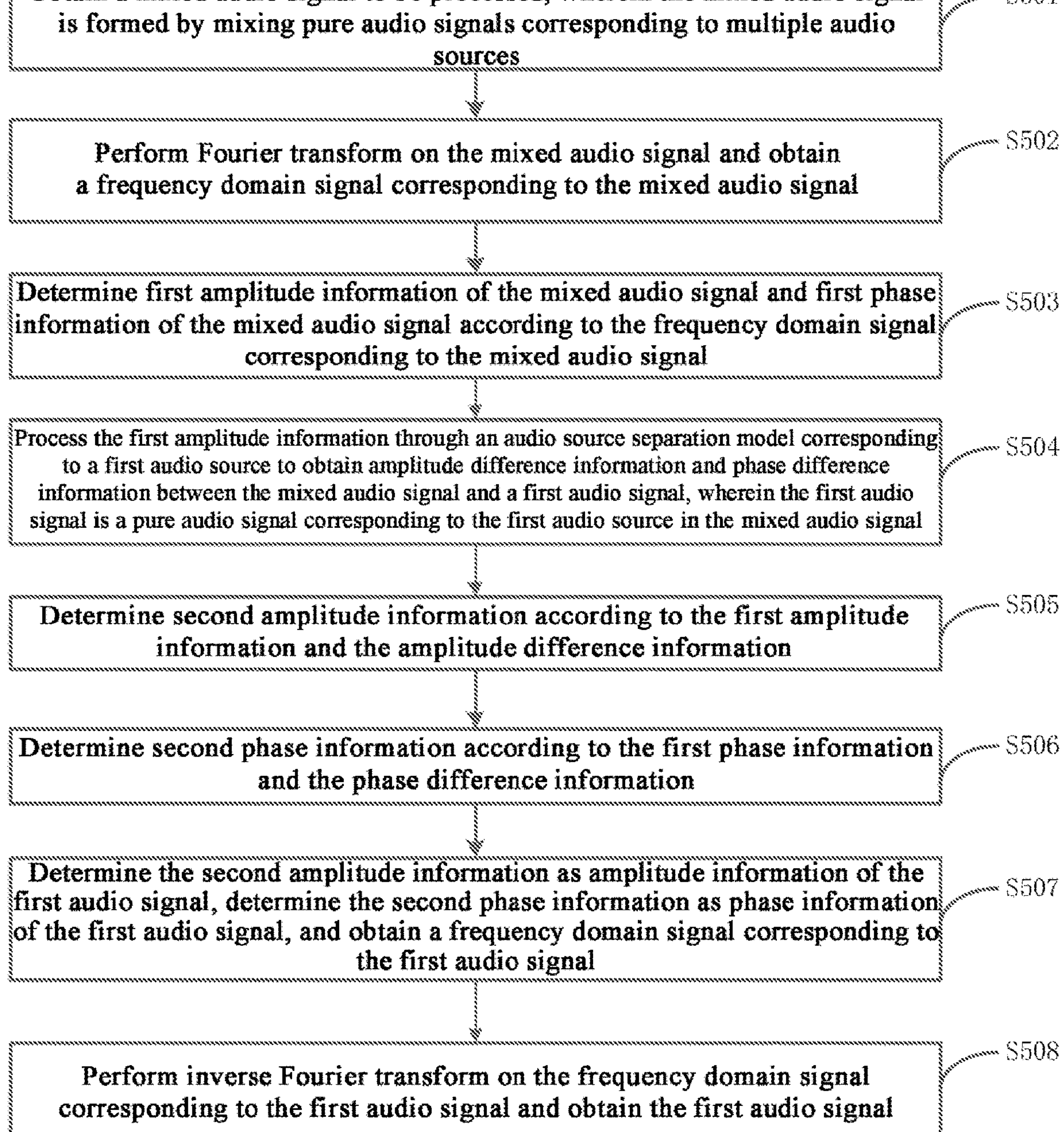
FIG. 5 is a schematic flowchart of another method for separating an audio signal according to an embodiment of the present disclosure.

FIG. 5 is a schematic flowchart of another method for separating an audio signal according to an embodiment of the present disclosure. As shown in FIG. 5, the method according to this example include:

S501: A mixed audio signal to be processed is obtained, wherein the mixed audio signal is formed by mixing pure audio signals corresponding to multiple audio sources.

S502: Fourier transform is performed on the mixed audio signal to obtain a frequency domain signal corresponding to the mixed audio signal.

Figure 6:
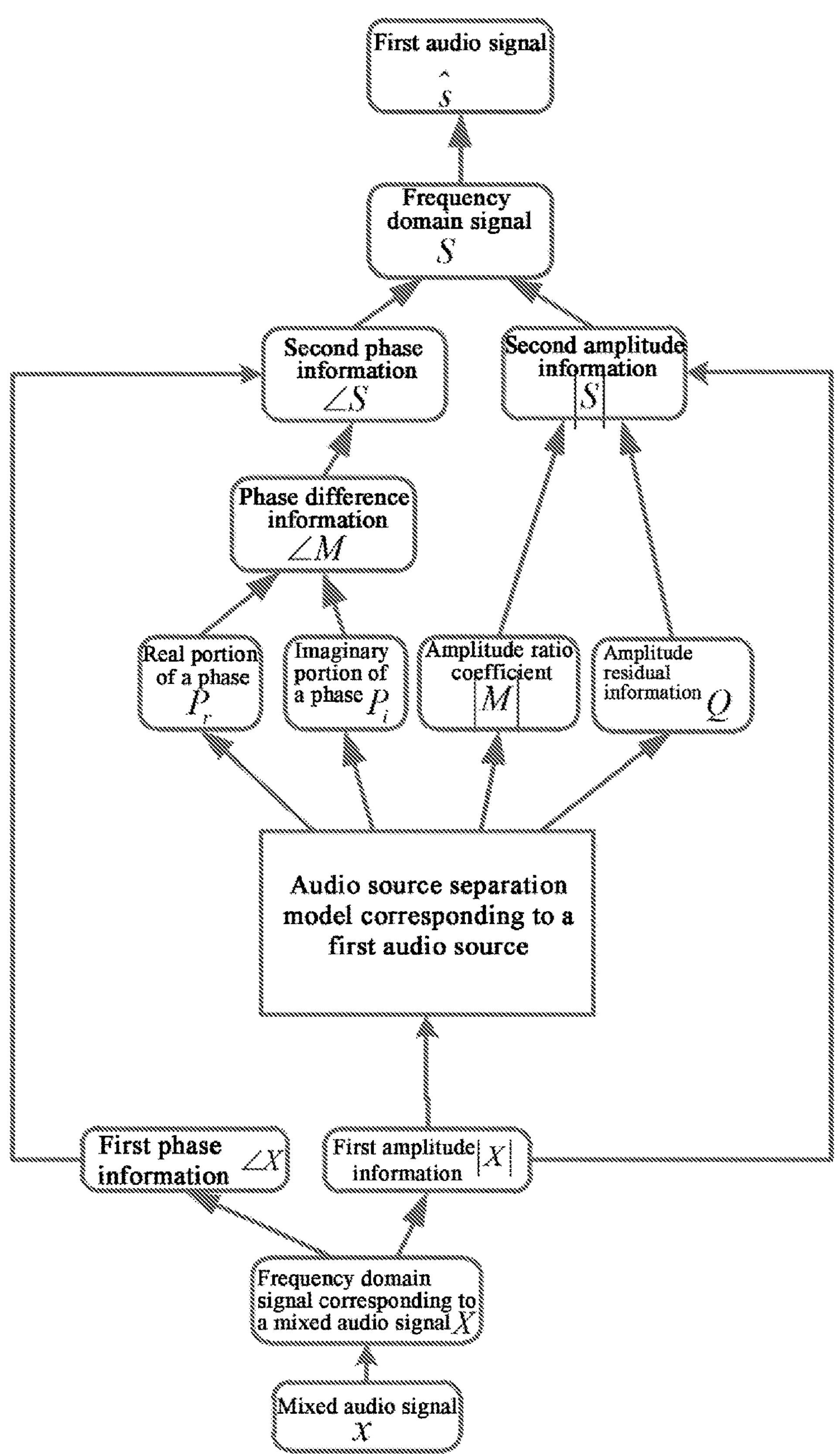
FIG. 6 is a schematic diagram of another process of separating an audio signal according to an embodiment of the present disclosure.

Illustrative description will be made with reference to FIG. 6 below. FIG. 6 is a schematic diagram of another process of separating an audio signal according to an embodiment of the present disclosure. As shown in FIG. 6, the mixed audio signal to be processed is assumed to be x and the pure audio signal (that is, the first audio signal) corresponding to the first audio source in the mixed audio signal is expressed as s in this embodiment. Short-time Fourier transform is performed on the mixed audio signal x to obtain a frequency domain signal X corresponding to the mixed audio signal x. The frequency domain signal corresponding to the first audio signal s is expressed as S. For a convenience of distinction, the first audio signal separated by the method of this embodiment is expressed as $\hat{S}$, and the frequency domain signals corresponding to the first audio signal is expressed as $\hat{S}$.

S503: First amplitude information of the mixed audio signal and first phase information of the mixed audio signal are determined according to the frequency domain signal corresponding to the mixed audio signal.

With reference to FIG. 6, the first amplitude information $|X|$ of the mixed audio signal and the first phase information $\angle X$ of the mixed audio signal may be obtained from the frequency domain signal X corresponding to the mixed audio signal.

S504: The first amplitude information is processed through an audio source separation model corresponding to a first audio source to obtain amplitude difference information and phase difference information between the mixed audio signal and a first audio signal, wherein the first audio signal is a pure audio signal corresponding to the first audio source in the mixed audio signal.

S505: Second amplitude information is determined according to the first amplitude information and the amplitude difference information.

The amplitude difference information includes an amplitude ratio coefficient and amplitude residual information.

In a possible implementation manner, a product of the first amplitude information and the amplitude ratio coefficient is determined as third amplitude information, and a sum of the third amplitude information and the amplitude residual information is determined as fourth amplitude information. Nonlinear processing is performed on the fourth amplitude information by using a preset activation function to obtain the second amplitude information.

In this embodiment, the determined second amplitude information may be regarded as the amplitude information of the first audio signal. A process of determining the second amplitude information will be described through the following example.

In this embodiment, a method based on complex ideal ratio mask (cIRM) is used for audio separation, that is, cIRM is used to represent the difference information between the mixed audio signal and the first audio signal. The difference information may include the amplitude difference information and the phase difference information.

In the following, cIRM is expressed as $\hat{M}$, and $\hat{M}$ may be expressed by the following equation.

$$\hat{M} = \frac{S}{X} = \frac{S_r + iS_i}{X_r + iX_i} = \frac{S_r X_r + S_i X_i + i(S_i X_r - S_r X_i)}{X_r^2 + X_i^2}$$

In the equation, $X_r$ and $X_i$ denote a real portion and an imaginary portion of X respectively, and $S_r$ and $S_i$ denote a real portion and an imaginary portion of S respectively. According to the equation described above, the following equation may be obtained:

$$S = \hat{M}X = |\hat{M}||X|e^{j(\angle\hat{M}+\angle X)}$$

The equation described above shows that S may be obtained by changing the amplitude and the phase of X. In the equation, $|\hat{M}|$ denotes the amplitude ratio coefficient and $\angle\hat{M}$ denotes the phase difference information. A value range of $|\hat{M}|$ is [0, 1]. In this way, the first audio signal may be determined according to $|\hat{M}|$, $\angle\hat{M}$, $|X|$ and $\angle X$ in this embodiment.

However, in a process of implementing the present disclosure, the Applicant further finds that the first audio signal separated by using $|\hat{M}|$ and $\angle\hat{M}$ still has a certain degree of distortion. An analysis of reasons of distortion will be described in detail below.

Figure 7A:
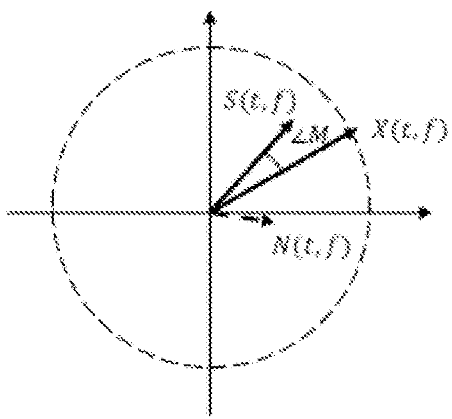
FIGS. 7A and 7B are schematic diagrams of an additive noise model according to an embodiment of the present disclosure.
Figure 7B:
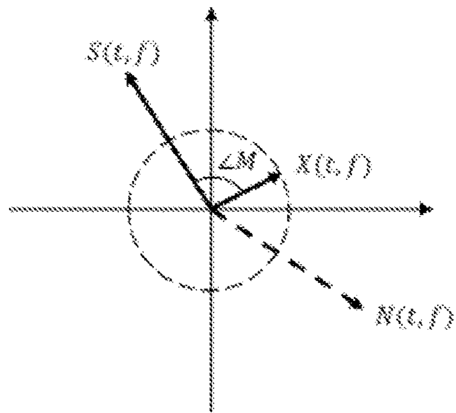

FIGS. 7A and 7B are schematic diagrams of an additive noise model according to an example of the present disclosure. For a convenience of understanding, this embodiment adopts an additive noise model $$X(t, f) = S(t, f) + N(t, f).$$

Wherein, X(t,f) denotes the mixed audio signal, S(t,f) denotes the first audio signal and N(t,f) denotes noise (the noise may be regarded as a remaining part of the mixed audio signal except the first audio signal). FIG. 7A shows a case where an amplitude $|\hat{M}|$ of cIRM is less than 1. When a value range of $|\hat{M}|$ is [0, 1], the case shown in FIG. 7A may be simulated. However, with reference to FIG. 7B, in an actual application, a case where the amplitude $|\hat{M}|$ of cIRM being greater than 1 may still exists. For example, when S and N have opposite phases, the amplitude of the mixed audio signal X will be less than the amplitude of the first audio signal S.

It may be seen that since the value range of $|\hat{M}|$ is [0, 1], the separation effect may be poor in some scenarios. In order to further verify the analysis result described above, the Applicant conducted several comparative tests.

In this example, the following equation is used to define a signal-to-distortion ratio (SDR), and the SDR is used to evaluate a separation performance of the first audio signal. The higher the SDR is, the better the separation effect of the first audio signal is. The lower the SDR is, the worse the separation effect of the first audio signal is. Ideally, the SDR is infinite in the case of perfect separation.

$$SDR(s, \hat{s}) = 10\log_{10}\frac{\|s\|^2}{\|\hat{s} - s\|^2}$$

In the equation described above, s denotes a real first audio signal and $\hat{S}$ denotes the first audio signal separated.

In this embodiment, experiments are conducted on multiple audio sources (a voice, an accompaniment, a bass sound, a drum sound, and other musical instruments) by using MUSDB18 data set, and experimental results are obtained as shown in Table 1.

TABLE 1

| | IRM (1) | IRM (inf) | cIRM (1) | cIRM (2) | cIRM (5) | cIRM (10) | cIRM (inf) |
|---|---|---|---|---|---|---|---|
| Voice | 10.04 | 10.42 | 19.84 | 31.02 | 41.04 | 47.62 | 54.50 |
| Accompaniment | 15.31 | 15.97 | 25.64 | 37.62 | 47.33 | 53.51 | 60.63 |
| Bass sound | 6.05 | 6.07 | 17.99 | 27.88 | 37.86 | 44.30 | 54.12 |
| Drum sound | 8.03 | 8.61 | 19.10 | 30.38 | 39.91 | 46.45 | 56.08 |
| Other music instruments | 7.28 | 7.37 | 18.97 | 28.91 | 39.08 | 45.64 | 56.00 |

The IRM in Table 1 illustrates a separation performance of the foregoing related art (that is, merely the amplitude difference information is predicted and the phase difference information is not predicted). In the table, IRM(1) denotes that an upper limit of the amplitude ratio coefficient $|\hat{M}|$ is 1, and IRM(inf) denotes that a value of the amplitude ratio coefficient $|\hat{M}|$ has no upper limit.

The cIRM in Table 1 illustrates a separation performance in the case of using the cIRM (that is, the amplitude difference information and the phase difference information are predicted respectively). In the table, cIRM(1) denotes that an upper limit of an amplitude ratio coefficient $|\hat{M}|$ is 1, cIRM(2) denotes that an upper limit of the amplitude ratio coefficient $|\hat{M}|$ is 2, cIRM(5) denotes that an upper limit of the amplitude ratio coefficient $|\hat{M}|$ is 5, cIRM(10) denotes that an upper limit of the amplitude ratio coefficient $|\hat{M}|$ is 10, and cIRM(inf) denotes that a value of the amplitude ratio coefficient $|\hat{M}|$ has no upper limit.

It may be seen from Table 1 that when the IRM is used, even if the value of the amplitude ratio coefficient $|\hat{M}|$ has no upper limit, the separation performance will not be significantly improved. In this embodiment, the separation performance may be significantly improved by using the cIRM, and with an increase in the upper limit of the amplitude ratio coefficient $|\hat{M}|$, the separation performance is also significantly improved.

Figure 8:
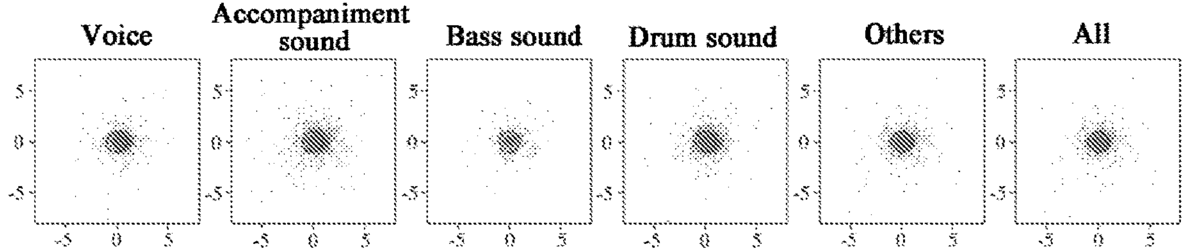
FIG. 8 is a schematic diagram showing distribution of cIRMs according to an embodiment of the present disclosure.

FIG. 8 is a schematic diagram showing distribution of cIRMs according to an embodiment of the present disclosure. As shown in FIG. 8, the distribution of cIRMs corresponding to different audio sources (a voice, an accompaniment, a bass sound, a drum sound, other musical instruments and all audio sources) is shown respectively. A horizontal axis denotes a real axis and a vertical axis denotes an imaginary axis. Each point in FIG. 8 denotes one cIRM, and a circle in FIG. 8 corresponds to a mask having an amplitude equal to 1. It may be seen from FIG. 8 that for each audio source, many cIRMs having amplitudes greater than 1 exist. The ratios of cIRMsm having amplitudes greater than 1 corresponding to the voice, the accompaniment, the bass sound, the drum sound and other musical instruments are 20.3%, 34.5%, 6.1%, 26.9% and 13.9%, respectively.

In this embodiment, in order to solve the problem of a poor separation effect caused by the upper limit of the amplitude ratio coefficient $|\hat{M}|$, the audio source separation model may further predicts amplitude residual information $\hat{Q}$ besides the amplitude ratio coefficient $|\hat{M}|$. That is, the amplitude difference information in this example may include the amplitude ratio coefficient $|\hat{M}|$ and the amplitude residual information $\hat{Q}$.

With further reference to FIG. 6, the first amplitude information $|X|$ of the mixed audio signal is input into the audio source separation model corresponding to the first audio source. The audio source separation model processes the first amplitude information $|X|$ to obtain the amplitude difference information and the phase difference information. The amplitude difference information includes the amplitude ratio coefficient $|\hat{M}|$ and the amplitude residual information $\hat{Q}$. According to the amplitude ratio coefficient $|\hat{M}|$ and the amplitude residual information $\hat{Q}$, the second amplitude information $|\hat{S}|$ may be determined by using the following equation:

$$|\hat{S}| = relu\left(|\hat{M}| \odot |X| + \hat{Q}\right)$$

In the equation, relu( ) denotes a preset activation function for nonlinear processing. By using relu( ) for nonlinear processing, it is guaranteed that the determined second amplitude information $|\hat{S}|$ is greater than 0.

In this example, the second amplitude information $|\hat{S}|$ is the amplitude information of the first audio signal. In the process described above, both the amplitude ratio coefficient $|\hat{M}|$ and the amplitude residual information $\hat{Q}$ are predicted, such that the determined amplitude information of the first audio signal is more accurate. In addition, predicting the amplitude residual information $\hat{Q}$ is equivalent to canceling of the upper limit of the amplitude ratio coefficient $|\hat{M}|$, such that the problem of the poor separation effect caused by the upper limit of the amplitude ratio coefficient $|\hat{M}|$ is solved.

S506: Second phase information is determined according to the first phase information and the phase difference information.

With further reference to FIG. 6, the audio source separation model processes the first amplitude information $|X|$ and the obtained phase difference information includes real portion information $\hat{P}_r$ and imaginary portion information $\hat{P}_r$. In this way, the phase difference information $\angle\hat{M}$ may be determined according to the real portion information $\hat{P}_r$ and the imaginary portion information of the phase $\hat{P}_r$.

In this way, according to the first phase information $\angle X$ and the phase difference information $\angle\hat{M}$, the second phase information $\angle\hat{S}$ may be determined as follows:

$$\angle\hat{S} = \angle\hat{M} + \angle X$$

S507: The second amplitude information is taken as amplitude information of the first audio signal, the second phase information is taken as phase information of the first audio signal, and a frequency domain signal corresponding to the first audio signal is obtained.

Specifically, the frequency domain signal $\hat{S}$ corresponding to the first audio signal may be obtained by using the following equation:

$$\hat{S} = |\hat{S}|e^{j(\angle\hat{S})}$$

S508: Inverse Fourier transform is performed on the frequency domain signal corresponding to the first audio signal to obtain the first audio signal.

With further reference to FIG. 6, inverse Fourier transform is performed on the frequency domain signal $\hat{S}$ corresponding to the first audio signal, and the first audio signal $\hat{S}$ is obtained.

In this embodiment, by predicting the amplitude residual information, the upper limit of the amplitude ratio coefficient may be canceled, and the problem of the poor separation effect caused by the upper limit of the amplitude ratio coefficient is solved.

On the basis of any above embodiment, a structure and a training process of the audio source separation model will be explained in conjunction with a specific example.

Figure 9A:
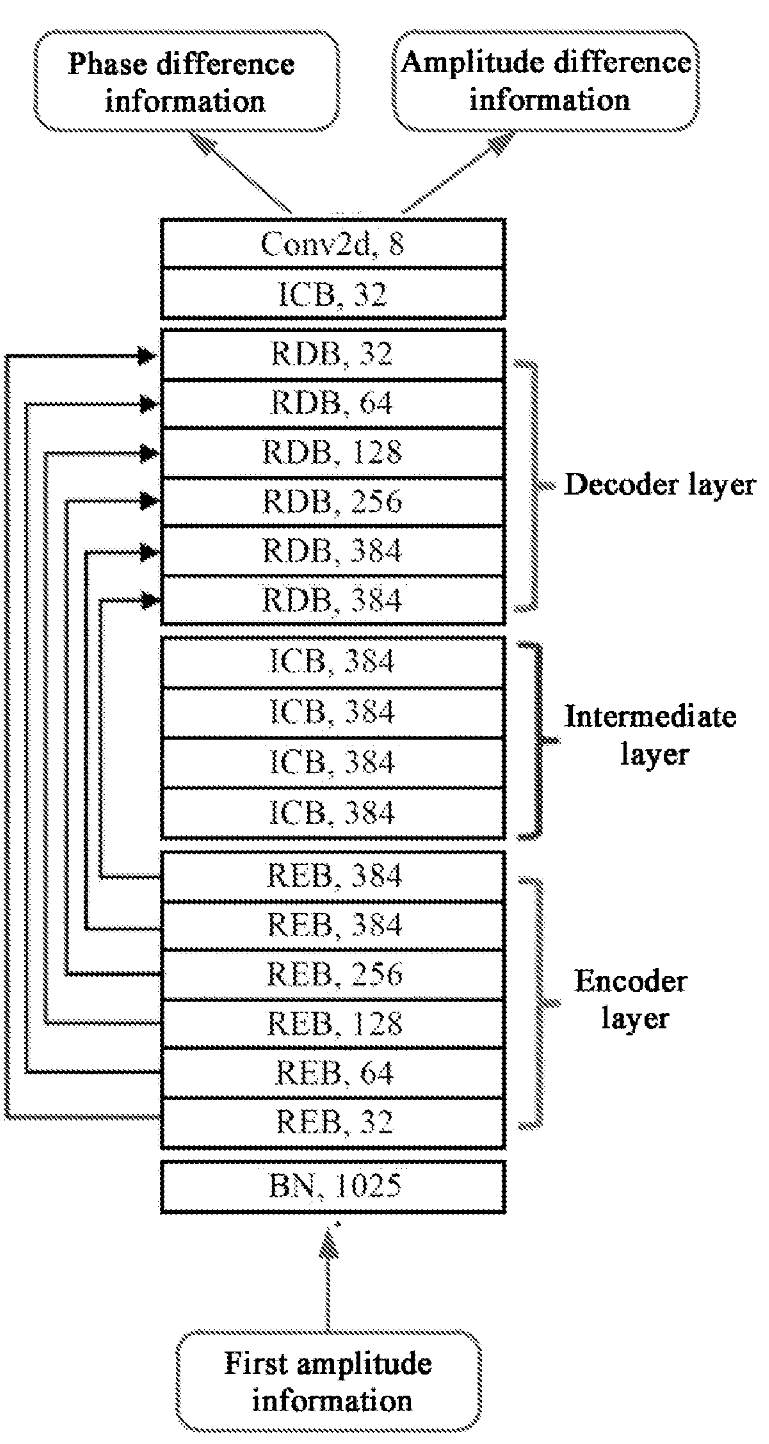
FIG. 9A is a schematic structural diagram of an audio source separation model according to an embodiment of the present disclosure.
Figures 9B, 9C, 9D:
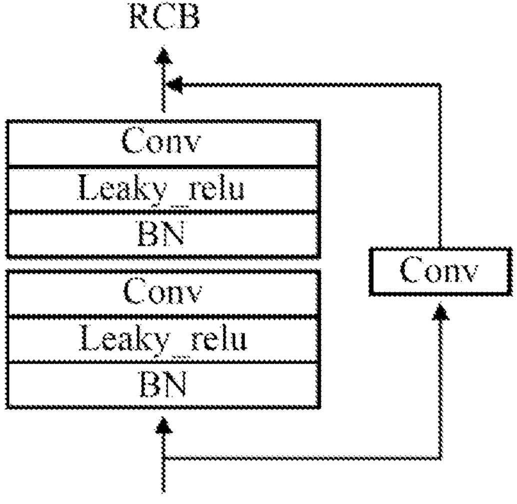
FIG. 9B is a schematic structural diagram of a residual encoder block (REB) in FIG. 9A.
FIG. 9C is a schematic structural diagram of a residual decoder block (RDB) in FIG. 9A.
FIG. 9D is a schematic structural diagram of residual convolutional blocks (RCB) in FIGS. 9B and 9C.

FIG. 9A is a schematic structural diagram of an audio source separation model according to an embodiment of the present disclosure, FIG. 9B is a schematic structural diagram of a residual encoder block (REB) in FIG. 9A, FIG. 9C is a schematic structural diagram of a residual decoder block (RDB) in FIG. 9A, and FIG. 9D is a schematic structural diagram of residual convolutional blocks (RCB) in FIGS. 9B and 9C.

As shown in FIG. 9A, the audio source separation model includes an encoder layer, an intermediate layer and a decoder layer. The encoder layer and the intermediate layer are configured to extract a feature of first amplitude information, the decoder layer is configured to perform prediction according to a feature extraction result, and amplitude difference information and phase difference information are obtained.

With reference to FIGS. 9A, 9B and 9D, the encoder layer includes K residual encoder blocks (REB), wherein K is an integer greater than 1. In FIG. 9A, K=6 is taken as an example. Each REB includes four residual convolutional block (RCB) and Avg pool that are connected in sequence. Each RCB includes two convolutional layers (conv) having a kernel size of 3*3. Before each convolutional layer, each RCB further includes a batch normalization layer (BN) and an activation function layer (Leaky_relu). Conv connection is added between an input and an output of the RCB. In each REB, a 2*2 pooling layer is included after the four RCBs, such that a number of features is reduced. It may be seen that each REB includes 8 convolutional layers.

With reference to FIGS. 9A, 9C and 9D, the decoder layer includes K residual decoder blocks (RDB). In FIG. 9A, K=6 is taken as an example. Each RDB and each REBs are symmetric in a one-to-one corresponding manner. Each RDB includes a transposed convolutional layer and four RCBs that are connected in sequence. The transposed convolutional layer has a kernel size of 3*3, and is configured to up-sample a feature. The RCB in the RDB has a same structure as the RCB in the REB. In this way, each RDB includes nine convolutional layers.

In some possible implementation manners, the intermediate layer may be introduced between the encoder layer and the decoder layer in order to further improve a feature expression capacity of the model. As shown in FIG. 9A, the intermediate layer includes T intermediate convolutional blocks (ICB), wherein T is an integer greater than 1. Each ICB includes four RCBs. In this way, each ICB includes eight convolutional layers.

Further, the batch normalization layer (BN) may be included before the encoder layer. After the decoder layer, one ICB and an output convolutional layer with J output channels may be further included. A value of J is related to a number of output parameters of the audio source separation model. In this embodiment, when it is necessary to output four parameters (including $|\hat{M}|$, $\hat{Q}$, $\hat{P}_r$ and $\hat{P}_t$ in FIG. 6), J is set to be 8.

It should be understood that in FIG. 9A, numbers indicated in each layer or each block denote the number of features. For example, 1025 in the BN layer denotes that the number of features is 1025.

In this example, a network depth is increased by using multiple REBs and multiple RDBs. With reference to FIG. 9A, when K=6 and T=4, the audio source separation model has 143 convolutional layers totally, such that an audio separation effect can be greatly improved.

In conjunction with the structure of the audio source separation model shown in FIG. 9A, a processing course of the audio source separation model will be described below.

In an example, as shown in FIG. 9A, when an intermediate layer is not included in the audio source separation model, the first amplitude information is processed by the encoder layer to obtain a first intermediate result. The first intermediate result is processed by the decoder layer to obtain the amplitude difference information and the phase difference information.

In another example, as shown in FIG. 9A, when an intermediate layer is included in the audio source separation model, the first amplitude information is processed by the encoder layer to obtain a first intermediate result. The first amplitude information is processed through the encoder layer and the intermediate layer to obtain a second intermediate result. The first intermediate result and the second intermediate result are processed by the decoder layer to obtain the amplitude difference information and the phase difference information.

A training process of the audio source separation model shown in FIG. 9A will be described below.

In this embodiment, an MUSDB18 data set is used to test the audio source separation model shown in FIG. 9A. The MUSDB18 data set includes pure audio signals corresponding to a single voice, accompaniment, bass sound and drum sound and other musical instruments. The pure audio signal is divided into 3-second segments, and a mixed audio signal x is obtained by randomly mixing the pure audio segments of different audio sources. Short-time Fourier transform is performed on the mixed audio signal x to obtain a frequency-domain signal. The frequency-domain signal is input into the audio separation model to train the audio separation model.

It should be noted that because the audio source separation model according to this embodiment adopts a network structure based on the convolutional layer, the audio source separation model does not need a previous state to compute current prediction, such that the audio source separation model supports parallel processing of multiple mixed audio signals.

Illustratively, during the training process, a batch size is set to be 16, and an adaptive moment estimation (Adam) optimizer is applied. For the voice, the accompaniment, the bass sound, the drum sound and other musical instruments, learning rates are set to be 0:001, 0:0005, 0:0001, 0:0002 and 0:0005 respectively. These learning rates are adjusted according to a verification set of the MUSDB18 data set. The learning rate per 15,000 steps is multiplied by a coefficient of 0.9. After a learning process of 300,000 steps, the audio source separation model trained is obtained.

Figure 10:
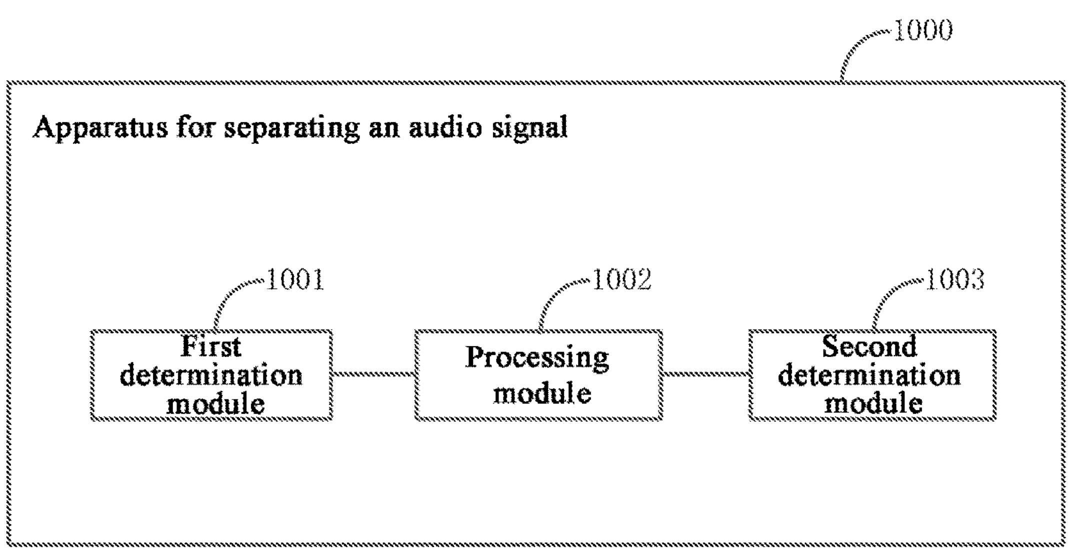
FIG. 10 is a schematic structural diagram of an apparatus for separating an audio signal according to an embodiment of the present disclosure.

FIG. 10 is a schematic structural diagram of an apparatus for separating an audio signal according to an embodiment of the present disclosure. The apparatus may be in a form of software and/or hardware. As shown in FIG. 10, the apparatus 1000 for separating an audio signal according to this embodiment includes a first determination module 1001, a processing module 1002, and a second determination module 1003.

The first determination module 1001 is configured to determine first amplitude information of a mixed audio signal to be processed and first phase information of the mixed audio signal, wherein the mixed audio signal is formed by mixing pure audio signals corresponding to multiple audio sources.

The processing module 1002 is configured to process the first amplitude information and obtain amplitude difference information and phase difference information between the mixed audio signal and a first audio signal, wherein the first audio signal is a pure audio signal corresponding to a first audio source in the mixed audio signal.

The second determination module 1003 is configured to determine the first audio signal according to the first amplitude information, the first phase information, the amplitude difference information, and the phase difference information.

In a possible implementation manner, the second determination module 1003 is specifically configured to:

- determine second amplitude information according to the first amplitude information and the amplitude difference information;
- determine second phase information according to the first phase information and the phase difference information; and
- determine the first audio signal according to the second amplitude information and the second phase information.

In a possible implementation manner, the amplitude difference information includes amplitude ratio coefficient and amplitude residual information. The second determination module 1003 is specifically configured to:

- determine a product of the first amplitude information and the amplitude ratio coefficient as third amplitude information;
- determine a sum of the third amplitude information and the amplitude residual information as fourth amplitude information; and
- perform nonlinear processing on the fourth amplitude information by using a preset activation function and obtain the second amplitude information.

In one possible implementation manner, the second determination module 1003 is specifically configured to:

- take the second amplitude information as amplitude information of the first audio signal, take the second phase information as phase information of the first audio signal, and obtain a first frequency domain signal corresponding to the first audio signal; and
- perform inverse Fourier transform on the first frequency domain signal and obtain the first audio signal.

In a possible implementation manner, the first determination module 1001 is specifically configured to:

- perform Fourier transform on the mixed audio signal and obtain a second frequency domain signal corresponding to the mixed audio signal; and
- determine the first amplitude information and the first phase information according to the second frequency domain signal.

In a possible implementation manner, the processing module 1002 is specifically configured to: process the first amplitude information through an audio source separation model corresponding to the first audio source and obtain the amplitude difference information and the phase difference information between the mixed audio signal and the first audio signal.

The audio source separation model is obtained by training a plurality of training samples, each training sample includes amplitude information of a sample mixed audio signal, and amplitude difference information and phase difference information between the sample mixed audio signal and a sample pure audio signal, and the sample pure audio signal is a pure audio signal corresponding to the first audio source in the sample mixed audio signal.

In a possible implementation manner, the audio source separation model includes an encoder layer and a decoder layer, the encoder layer includes multiple REBs, and the decoder layer includes multiple RDBs. The processing module 1002 is specifically configured to:

- process the first amplitude information through the encoder layer and obtain a first intermediate result; and
- process the first intermediate result through the decoder layer and obtain the amplitude difference information and the phase difference information.

In a possible implementation manner, the audio source separation model further includes an intermediate layer, the intermediate layer is arranged between the encoder layer and the decoder layer, and the intermediate layer includes multiple intermediate convolutional blocks (ICB). The processing module is specifically configured to:

- process the first amplitude information through the encoder layer and the intermediate layer and obtain a second intermediate result; and
- process the first intermediate result and the second intermediate result through the decoder layer and obtain the amplitude difference information and the phase difference information.

The apparatus for separating an audio signal according to this embodiment may be configured to execute a method for separating an audio signal provided in any above method embodiment, and has similar implementation principles and technical effects, which will not be repeated herein.

In order to implement the embodiment described above, an embodiment of the present disclosure further provides an electronic device.

Figure 11:
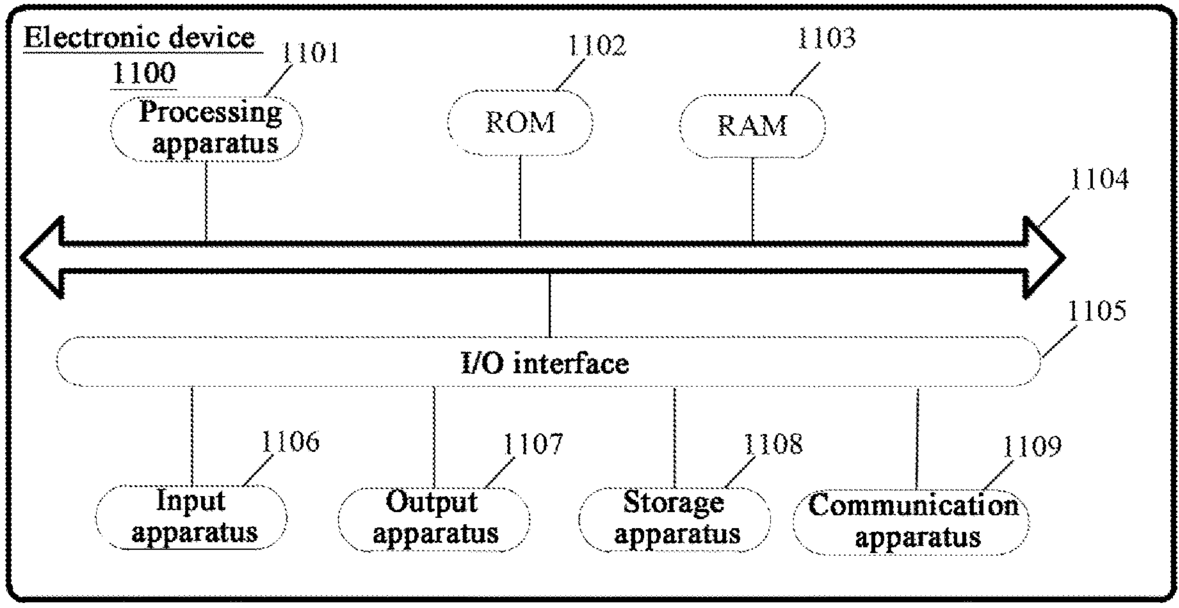
FIG. 11 is a schematic structural diagram of an electronic device according to an embodiment of the present disclosure.

With reference to FIG. 11, a schematic structural diagram of the electronic device 1100 configured to implement an embodiment of the present disclosure is shown. The electronic device 1100 may be a terminal device or a server. The terminal device may include, but is not limited to, a mobile terminal such as a mobile phone, a laptop, a digital broadcast receiver, a personal digital assistant (PDA), a portable android device (PAD), a portable media player (PMP), a vehicle-mounted terminal (including a vehicle-mounted navigation terminal), and a fixed terminal such as a digital TV and a desktop computer. The electronic device shown in FIG. 11 is merely an example, and should not be constructed as limitation to functions and application scopes of the embodiment of the present disclosure.

As shown in FIG. 11, the electronic device 1100 may include a processing apparatus 1101 (including a central processing unit, a graphics processing unit, etc.) that may execute various appropriate actions and processing according to a program stored in a read-only memory (ROM) 1102 or a program loaded from a storage apparatus 1108 to a random access memory (RAM) 1103. The RAM 1103 may further store various programs and data required for the operation by the electronic device 1100. The processing apparatus 1101, the ROM 1102, and the RAM 1103 are connected to one another through a bus 1104. An input/output (I/O) interface 1105 is also connected to the bus 1104.

Generally, the following apparatuses may be connected to the I/O interface 1105: an input apparatus 1106 including, for example, a touch screen, a touch pad, a keyboard, a mouse, a camera, a microphone, an accelerometer, a gyroscope, etc., an output apparatus 1107 including, for example, a liquid crystal display (LCD), a speaker, a vibrator, etc., a storage apparatus 1108 including, for example, a magnetic tape, a hard disk, etc., and a communication apparatus 1109. The communication apparatus 1109 may allow the electronic device 1100 to be in wireless or wired communication with other devices for data exchange. Although the electronic device 1100 having various apparatuses is shown in FIG. 11, it should be understood that all the devices shown are not required to be implemented or provided. More or fewer apparatuses may be alternatively implemented or provided.

Specifically, according to embodiments of the present disclosure, a process described above with reference to the flowchart may be implemented as a computer software program. For example, an embodiment of the present disclosure includes a computer program product. The computer program product includes a computer program carried on a computer-readable medium, and the computer program includes program codes for executing the method shown in the flowchart. In such an embodiment, the computer program may be downloaded and mounted from the network through the communication apparatus 1109, or mounted from the storage apparatus 1108, or mounted from the ROM 1102. When executed by the processing apparatus 1101, the computer program executes the above functions defined in the method of the example of the present disclosure.

It should be noted that the computer-readable storage medium described above in the present disclosure may be a computer-readable signal medium or a computer-readable storage medium or any combination thereof. For example, the computer-readable storage medium may include, but not limited to, an electric, magnetic, optical, electromagnetic, infrared, or semiconductor system, apparatus or device, or any combination thereof. More specific examples of the computer-readable storage medium may include, but is not limited to: an electrical connection with one or more wires, a portable computer disk, a hard disk, an RAM, an ROM, an erasable programmable read-only memory (EPROM or a flash memory), an optical fiber, a portable compact disk read only memory (CD-ROM), an optical storage device, a magnetic storage device, or any suitable combination thereof. In the present disclosure, the computer-readable storage medium may be any tangible medium including or storing a program, and the program may be used by or in combination with an instruction execution system, apparatus or device. In the present disclosure, the computer-readable signal medium may include a data signal propagated in a baseband or as part of a carrier wave, in which a computer-readable program code is carried. This propagated data signal may have multiple forms, including but not limited to an electromagnetic signal, an optical signal or their any suitable combination. The computer-readable signal medium may be further any computer-readable medium other than the computer-readable storage medium, and the computer-readable medium may send, propagate or transmit a program used by or in combination with the instruction execution system, apparatus or device. The program code included in the computer-readable medium may be transmitted by any suitable medium, including but not limited to: a wireless, wire, optical cable, radio (RF) medium, etc., or their any suitable combination.

The computer-readable medium may be included in the electronic device, or exist independently without being fitted into the electronic device.

The computer-readable medium carries one or more programs, and when executed by the electronic device, the one or more programs cause the electronic device to execute the method shown in the example described above.

Computer program codes for executing the operations of the present disclosure may be written in one or more programming languages or their combinations, and the programming languages include object-oriented programming languages including Java, Smalltalk. C++, and further include conventional procedural programming languages including "C" language or similar programming languages. The program codes may be completely executed on a computer of the user, partially executed on the computer of the user, executed as an independent software package, partially executed on the computer of the user and a remote computer separately, or completely executed on the remote computer or the server. In the case of involving a remote computer, the remote computer may be connected to a user computer through any kind of network, including a local area network (LAN) or a wide area network (WAN), or may be connected to an external computer (for example, through the Internet provided by an Internet service provider).

The flowcharts and block diagrams in the accompanying drawings illustrate the architectures, functions and operations that may be implemented by the systems, the methods and the computer program products according to various examples of the present disclosure. In this regard, each block in the flowchart or block diagram may represent a module, a program segment, or a part of codes that includes one or more executable instructions for implementing specified logical functions. It should also be noted that in some alternative implementations, the functions indicated in the blocks may occur in an order different than those noted in the accompanying drawings. For example, two blocks represented in succession may actually be executed in substantially parallel, and may sometimes be executed in a reverse order depending on the functions involved. It should also be noted that each block in the block diagram and/or flowchart, and a combination of blocks in the block diagram and/or flowchart may be implemented by a specific hardware-based system that executes specified functions or operations, or may be implemented by a combination of specific hardware and computer instructions.

The units involved in the example of the present disclosure may be implemented by software or hardware. A name of the unit does not constitute limitation of the unit itself in some cases. For example, a first obtaining unit may also be described as "a unit that obtains at least two Internet protocol addresses".

The functions described above herein may be executed at least in part by one or more hardware logic components. For example, usable hardware logic components of illustrative types include, in an unlimited manner, a field programmable gate array (FPGA), an application specific integrated circuit (ASIC), an application specific standard parts (ASSP), a system on chip (SOC), a complex programmable logic device (CPLD), etc.

In the context of the present disclosure, a machine-readable medium may be a tangible medium, and may include or store a program that is used by or in combination with the instruction execution system, apparatus or device. The machine-readable medium may be a machine-readable signal medium or a machine-readable storage medium. The machine-readable medium may include, but not limited to, an electric, magnetic, optical, electromagnetic, infrared, or semiconductor system, apparatus or device, or their any suitable combination. More specific examples of the machine-readable storage medium may include an electrical connection based on one or more wires, a portable computer disk, a hard disk, an RAM, an ROM, an EPROM, an optical fiber, a CD-ROM, an optical storage device, a magnetic storage device, or their any suitable combination.

In a first aspect, according to one or more examples of the present disclosure, a method for separating an audio signal is provided. The method includes:

determining first amplitude information of a mixed audio signal to be processed and first phase information of the mixed audio signal, wherein the mixed audio signal is formed by mixing pure audio signals corresponding to multiple audio sources;

processing the first amplitude information, and obtaining amplitude difference information and phase difference information between the mixed audio signal and a first audio signal, wherein the first audio signal is a pure audio signal corresponding to a first audio source in the mixed audio signal; and determining the first audio signal according to the first amplitude information, the first phase information, the amplitude difference information, and the phase difference information.

According to one or more embodiments of the present disclosure, the step of determining the first audio signal according to the first amplitude information, the first phase information, the amplitude difference information, and the phase difference information includes:

determining second amplitude information according to the first amplitude information and the amplitude difference information;

determining second phase information according to the first phase information and the phase difference information;

determining the first audio signal according to the second amplitude information and the second phase information.

According to one or more embodiments of the present disclosure, the amplitude difference information includes an amplitude ratio coefficient and amplitude residual information. The step of determining second amplitude information according to the first amplitude information and the amplitude difference information includes:

determining a product of the first amplitude information and the amplitude ratio coefficient as third amplitude information;

determining a sum of the third amplitude information and the amplitude residual information as fourth amplitude information;

performing nonlinear processing on the fourth amplitude information by using a preset activation function and obtaining the second amplitude information.

According to one or more embodiments of the present disclosure, the step of determining the first audio signal according to the second amplitude information and the second phase information includes:

determining the second amplitude information as amplitude information of the first audio signal, determining the second phase information as phase information of the first audio signal, and obtaining a first frequency domain signal corresponding to the first audio signal;

performing inverse Fourier transform on the first frequency domain signal and obtaining the first audio signal.

According to one or more embodiments of the present disclosure, the step of determining first amplitude information of a mixed audio signal to be processed and first phase information of the mixed audio signal includes:

performing Fourier transform on the mixed audio signal and obtaining a second frequency domain signal corresponding to the mixed audio signal; and determining the first amplitude information and the first phase information according to the second frequency domain signal.

According to one or more embodiments of the present disclosure, the steps of processing the first amplitude information and obtaining amplitude difference information and phase difference information between the mixed audio signal and a first audio signal include:

processing the first amplitude information through an audio source separation model corresponding to the first audio source, and obtaining the amplitude difference information and the phase difference information between the mixed audio signal and the first audio signal.

The audio source separation model is obtained by training multiple training samples, each training sample includes: amplitude information of a sample mixed audio signal, and amplitude difference information and phase difference information between the sample mixed audio signal and a sample pure audio signal, and the sample pure audio signal is a pure audio signal corresponding to the first audio source in the sample mixed audio signal.

According to one or more embodiments of the present disclosure, the audio source separation model includes an encoder layer and a decoder layer, the encoder layer includes multiple residual encoder blocks (REB), and the decoder layer includes multiple residual decoder blocks (RDB).

The steps of processing the first amplitude information through an audio source separation model corresponding to the first audio source and obtaining the amplitude difference information and the phase difference information between the mixed audio signal and the first audio signal includes:

processing the first amplitude information through the encoder layer to obtain a first intermediate result; and processing the first intermediate result through the decoder layer to obtain the amplitude difference information and the phase difference information.

According to one or more embodiments of the present disclosure, the audio source separation model further includes an intermediate layer, the intermediate layer is arranged between the encoder layer and the decoder layer, and the intermediate layer includes multiple intermediate convolutional blocks (ICB).

The steps of determining first intermediate result through the decoder layer to obtain the amplitude difference information and the phase difference information includes:

processing the first amplitude information through the encoder layer and the intermediate layer to obtain a second intermediate result; and processing the first intermediate result and the second intermediate result through the decoder layer and the amplitude difference information to obtain the phase difference information.

In a second aspect, according to one or more embodiments of the present disclosure, an apparatus for separating an audio signal is provided. The apparatus includes:

a first determination module configured to determine first amplitude information of a mixed audio signal to be processed and first phase information of the mixed audio signal, wherein the mixed audio signal is formed by mixing pure audio signals corresponding to multiple audio sources;

a processing module configured to process the first amplitude information and obtain amplitude difference information and phase difference information between the mixed audio signal and a first audio signal, wherein the first audio signal is a pure audio signal corresponding to a first audio source in the mixed audio signal; and a second determination module configured to determine the first audio signal according to the first amplitude information, the first phase information, the amplitude difference information, and the phase difference information.

According to one or more embodiments of the present disclosure, the second determination module is specifically configured to:

determine second amplitude information according to the first amplitude information and the amplitude difference information;

determine second phase information according to the first phase information and the phase difference information; and determine the first audio signal according to the second amplitude information and the second phase information.

According to one or more embodiments of the present disclosure, the amplitude difference information includes amplitude ratio coefficient and amplitude residual information. The second determination module is specifically configured to:

determine a product of the first amplitude information and the amplitude ratio coefficient as third amplitude information;

determine a sum of the third amplitude information and the amplitude residual information as fourth amplitude information; and perform nonlinear processing on the fourth amplitude information by using a preset activation function and obtain the second amplitude information.

According to one or more embodiments of the present disclosure, the second determination module is specifically configured to:

determine the second amplitude information as amplitude information of the first audio signal, determine the second phase information as phase information of the first audio signal, and obtain a first frequency domain signal corresponding to the first audio signal; and perform inverse Fourier transform on the first frequency domain signal and obtain the first audio signal.

According to one or more embodiments of the present disclosure, the first determination module is specifically configured to:

perform Fourier transform on the mixed audio signal and obtain a second frequency domain signal corresponding to the mixed audio signal; and determine the first amplitude information and the first phase information according to the second frequency domain signal.

According to one or more embodiments of the present disclosure, the processing module is specifically configured to:

process the first amplitude information through an audio source separation model corresponding to the first audio source to obtain the amplitude difference information and the phase difference information between the mixed audio signal and the first audio signal.

The audio source separation model is obtained by training multiple training samples, each training sample includes amplitude information of a sample mixed audio signal, and amplitude difference information and phase difference information between the sample mixed audio signal and a sample pure audio signal, and the sample pure audio signal is a pure audio signal corresponding to the first audio source in the sample mixed audio signal.

According to one or more embodiments of the present disclosure, the audio source separation model includes an encoder layer and a decoder layer, the encoder layer includes multiple residual encoder blocks (REB), and the decoder layer includes multiple residual decoder blocks (RDB). The processing module is specifically configured to:

process the first amplitude information through the encoder layer to obtain a first intermediate result; and process the first intermediate result through the decoder layer to obtain the amplitude difference information and the phase difference information.

According to one or more embodiments of the present disclosure, the audio source separation model further includes an intermediate layer, the intermediate layer is arranged between the encoder layer and the decoder layer, and the intermediate layer includes multiple intermediate convolutional blocks (ICB). The processing module is specifically configured to:

process the first amplitude information through the encoder layer and the intermediate layer to obtain a second intermediate result; and process the first intermediate result and the second intermediate result through the decoder layer to obtain the amplitude difference information and the phase difference information.

In a third aspect, according to one or more embodiments of the present disclosure, an electronic device is provided. The electronic device includes: at least one processor and a memory;

the memory stores a computer-executable instruction; and the at least processor executes the computer-executable instruction stored in the memory, and the at least processor executes the method in any possible design according to the first aspect and the second aspect.

In a fourth aspect, according to one or more embodiments of the present disclosure, a computer-readable storage medium is provided. The computer-readable storage medium stores computer-executable instructions, wherein the computer-executable instructions implement the method in any possible design in the first aspect and the second aspect when executed by a processor.

In a fifth aspect, according to one or more embodiments of the present disclosure, a computer program product is provided. The computer program product includes a computer program, where the computer program implements the method in any possible design in the first aspect and the second aspect when executed by a processor.

In a sixth aspect, according to one or more embodiments of the present disclosure, a computer program is provided. The computer program implements the method in any possible design in the first aspect and the second aspect when executed by a processor.

What is described above is merely explanation of preferred embodiments of the present disclosure and applied technical principles. It should be understood by those skilled in the art that the disclosed scope involved in the present disclosure is not limited to the technical solution formed by a specific combination of the technical features described above, but further covers other technical solution formed by any random combination of the technical features described above or their equivalent features without departing from the concepts described above of the present disclosure, for example, a technical solution formed by interchanging the features described above and (non-limitative) technical features having similar functions as disclosed in the present disclosure.

In addition, although the operations are depicted in a particular order, it should not be understood that these operations are required to be executed in the particular order shown or in a sequential order. In certain circumstances, multitasking and parallel processing may be favourable. Similarly, although several specific implementation details are included in the discussion described above, these details should not be construed as limitation to the scope of the present disclosure. Some features described in the context of a separate example can be further implemented in a single example in a combination manner. On the contrary, various features described in the context of a single example can be further implemented in multiple embodiments separately or in any suitable sub-combination manner.

Although the subject matter has been described in language specific to structural features and/or methodological logical actions, it should be understood that the subject matter defined in the appended claims is not necessarily limited to the specific features or actions described above. On the contrary, the specific features and actions described above are merely illustrative implementation forms of the claims.

What is claimed is:

1. A method for separating an audio signal, comprising:

determining first amplitude information of a mixed audio signal to be processed and first phase information of the mixed audio signal, wherein the mixed audio signal is formed by mixing single audio source audio signals corresponding to a plurality of audio sources;

processing the first amplitude information and obtaining amplitude difference information and phase difference information between the mixed audio signal and a first audio signal, wherein the first audio signal is a single audio source audio signal corresponding to a first audio source in the mixed audio signal; and determining the first audio signal according to the first amplitude information, the first phase information, the amplitude difference information, and the phase difference information;

wherein processing the first amplitude information and obtaining the phase difference information between the mixed audio signal and the first audio signal comprises:

processing the first amplitude information to obtain real portion information of a phase and imaginary portion information of the phase; and determining the phase difference information based on the real portion information of the phase and the imaginary portion information of the phase.

2. The method according to claim 1, wherein determining the first audio signal according to the first amplitude information, the first phase information, the amplitude difference information and the phase difference information comprises:

determining second amplitude information according to the first amplitude information and the amplitude difference information;

determining second phase information according to the first phase information and the phase difference information; and determining the first audio signal according to the second amplitude information and the second phase information.

3. The method according to claim 2, wherein the amplitude difference information comprises an amplitude ratio coefficient and amplitude residual information; and determining the second amplitude information according to the first amplitude information and the amplitude difference information comprises:

determining a product of the first amplitude information and the amplitude ratio coefficient as third amplitude information;

determining a sum of the third amplitude information and the amplitude residual information as fourth amplitude information; and performing nonlinear processing on the fourth amplitude information by using a preset activation function and obtaining the second amplitude information.

4. The method according to claim 2, wherein determining the first audio signal according to the second amplitude information and the second phase information comprises:

determining the second amplitude information as amplitude information of the first audio signal, determining the second phase information as phase information of the first audio signal, and obtaining a first frequency domain signal corresponding to the first audio signal; and performing inverse Fourier transform on the first frequency domain signal and obtaining the first audio signal.

5. The method according to claim 1, wherein determining the first amplitude information of the mixed audio signal to be processed and the first phase information of the mixed audio signal comprises:

performing Fourier transform on the mixed audio signal and obtaining a second frequency domain signal corresponding to the mixed audio signal; and determining the first amplitude information and the first phase information according to the second frequency domain signal.

6. The method according to claim 1, wherein processing the first amplitude information and obtaining the amplitude difference information and the phase difference information between the mixed audio signal and the first audio signal comprise:

processing the first amplitude information through an audio source separation model corresponding to the first audio source to obtain the amplitude difference information and the phase difference information between the mixed audio signal and the first audio signal;

wherein the audio source separation model is obtained by training a plurality of training samples, each training sample comprises amplitude information of a sample mixed audio signal, and amplitude difference information and phase difference information between the sample mixed audio signal and a sample single audio source audio signal, and the sample single audio source audio signal is a single audio source audio signal corresponding to the first audio source in the sample mixed audio signal.

7. The method according to claim 6, wherein the audio source separation model comprises an encoder layer and a decoder layer, the encoder layer comprises a plurality of residual encoder blocks (REB), and the decoder layer comprises a plurality of residual decoder blocks (RDB); and processing the first amplitude information through the audio source separation model corresponding to the first audio source to obtain the amplitude difference information and the phase difference information between the mixed audio signal and the first audio signal comprises:

processing the first amplitude information through the encoder layer to obtain a first intermediate result; and processing the first intermediate result through the decoder layer to obtain the amplitude difference information and the phase difference information.

8. The method according to claim 7, wherein the audio source separation model further comprises an intermediate layer, the intermediate layer is arranged between the encoder layer and the decoder layer, and the intermediate layer comprises a plurality of intermediate convolutional blocks (ICB); and processing the first intermediate result through the decoder layer to obtain the amplitude difference information and the phase difference information comprises:

processing the first amplitude information through the encoder layer and the intermediate layer to obtain a second intermediate result; and processing the first intermediate result and the second intermediate result through the decoder layer to obtain the amplitude difference information and the phase difference information.

9. An electronic device, comprising: a processor and a memory;

wherein the memory stores computer-executable instructions; and wherein the processor executes the computer-executable instructions, to cause the electronic device to:

determine first amplitude information of a mixed audio signal to be processed and first phase information of the mixed audio signal, wherein the mixed audio signal is formed by mixing single audio source audio signals corresponding to a plurality of audio sources;

process the first amplitude information and obtain amplitude difference information and phase difference information between the mixed audio signal and a first audio signal, wherein the first audio signal is a single audio source audio signal corresponding to a first audio source in the mixed audio signal; and determine the first audio signal according to the first amplitude information, the first phase information, the amplitude difference information, and the phase difference information;

wherein the computer-executable instructions that cause the electronic device to process the first amplitude information and obtain the phase difference information between the mixed audio signal and the first audio signal also cause the electronic device to:

process the first amplitude information to obtain real portion information of a phase and imaginary portion information of the phase; and determine the phase difference information based on the real portion information of the phase and the imaginary portion information of the phase.

10. The electronic device according to claim 9, wherein the computer-executable instructions that cause the electronic device to determine the first audio signal according to the first amplitude information, the first phase information, the amplitude difference information and the phase difference information also cause the electronic device to:

determine second amplitude information according to the first amplitude information and the amplitude difference information;

determine second phase information according to the first phase information and the phase difference information; and determine the first audio signal according to the second amplitude information and the second phase information.

11. The electronic device according to claim 10, wherein the amplitude difference information comprises an amplitude ratio coefficient and amplitude residual information; and wherein the computer-executable instructions that cause the electronic device to determine second amplitude information according to the first amplitude information and the amplitude difference information also cause the electronic device to:

determine a product of the first amplitude information and the amplitude ratio coefficient as third amplitude information;

determine a sum of the third amplitude information and the amplitude residual information as fourth amplitude information; and perform nonlinear processing on the fourth amplitude information by using a preset activation function and obtain the second amplitude information.

12. The electronic device according to claim 10, wherein the computer-executable instructions that cause the electronic device to determine the first audio signal according to the second amplitude information and the second phase information also cause the electronic device to:

determine the second amplitude information as amplitude information of the first audio signal, determine the second phase information as phase information of the first audio signal, and obtain a first frequency domain signal corresponding to the first audio signal; and perform inverse Fourier transform on the first frequency domain signal and obtain the first audio signal.

13. The electronic device according to claim 9, wherein the computer-executable instructions that cause the electronic device to determine the first amplitude information of the mixed audio signal to be processed and the first phase information of the mixed audio signal also cause the electronic device to:

perform Fourier transform on the mixed audio signal and obtain a second frequency domain signal corresponding to the mixed audio signal; and determine the first amplitude information and the first phase information according to the second frequency domain signal.

14. The electronic device according to claim 9, wherein the computer-executable instructions that cause the electronic device to process the first amplitude information and obtain the amplitude difference information and the phase difference information between the mixed audio signal and the first audio signal also cause the electronic device to:

process the first amplitude information through an audio source separation model corresponding to the first audio source to obtain the amplitude difference information and the phase difference information between the mixed audio signal and the first audio signal;

wherein the audio source separation model is obtained by training a plurality of training samples, each training sample comprises amplitude information of a sample mixed audio signal, and amplitude difference information and phase difference information between the sample mixed audio signal and a sample single audio source audio signal, and the sample single audio source audio signal is a single audio source audio signal corresponding to the first audio source in the sample mixed audio signal.

15. The electronic device according to claim 14, wherein the audio source separation model comprises an encoder layer and a decoder layer, the encoder layer comprises a plurality of residual encoder blocks (REB), and the decoder layer comprises a plurality of residual decoder blocks (RDB); and wherein the computer-executable instructions that cause the electronic device to process the first amplitude information through the audio source separation model corresponding to the first audio source to obtain the amplitude difference information and the phase difference information between the mixed audio signal and the first audio signal also cause the electronic device to:

process the first amplitude information through the encoder layer to obtain a first intermediate result; and process the first intermediate result through the decoder layer to obtain the amplitude difference information and the phase difference information.

16. The electronic device according to claim 15, wherein the audio source separation model further comprises an intermediate layer, the intermediate layer is arranged between the encoder layer and the decoder layer, and the intermediate layer comprises a plurality of intermediate convolutional blocks (ICB); and wherein the computer-executable instructions that cause the electronic device to process the first intermediate result through the decoder layer to obtain the amplitude difference information and the phase difference information also cause the electronic device to:

process the first amplitude information through the encoder layer and the intermediate layer to obtain a second intermediate result; and process the first intermediate result and the second intermediate result through the decoder layer to obtain the amplitude difference information and the phase difference information.

17. A non-transitory computer-readable storage medium, storing computer-executable instructions that, when executed, cause a processor to:

determine first amplitude information of a mixed audio signal to be processed and first phase information of the mixed audio signal, wherein the mixed audio signal is formed by mixing single audio source audio signals corresponding to a plurality of audio sources;

process the first amplitude information and obtain amplitude difference information and phase difference information between the mixed audio signal and a first audio signal, wherein the first audio signal is a single audio source audio signal corresponding to a first audio source in the mixed audio signal; and determine the first audio signal according to the first amplitude information, the first phase information, the amplitude difference information, and the phase difference information;

wherein the computer-executable instructions that cause the processor to process the first amplitude information and obtain the phase difference information between the mixed audio signal and the first audio signal also cause the processor to:

process the first amplitude information to obtain real portion information of a phase and imaginary portion information of the phase; and determine the phase difference information based on the real portion information of the phase and the imaginary portion information of the phase.

18. The non-transitory computer-readable storage medium according to claim 17, wherein the computer-executable instructions that cause the processor to determine the first audio signal according to the first amplitude information, the first phase information, the amplitude difference information and the phase difference information also cause the processor to:

determine second amplitude information according to the first amplitude information and the amplitude difference information;

determine second phase information according to the first phase information and the phase difference information; and determine the first audio signal according to the second amplitude information and the second phase information.

19. The non-transitory computer-readable storage medium according to claim 17, wherein the computer-executable instructions that cause the processor to determine the first amplitude information of the mixed audio signal to be processed and the first phase information of the mixed audio signal also cause the processor to:

perform Fourier transform on the mixed audio signal and obtain a second frequency domain signal corresponding to the mixed audio signal; and determine the first amplitude information and the first phase information according to the second frequency domain signal.

20. The non-transitory computer-readable storage medium according to claim 17, wherein the computer-executable instructions that cause the processor to process the first amplitude information and obtain the amplitude difference information and the phase difference information between the mixed audio signal and the first audio signal also cause the processor to:

process the first amplitude information through an audio source separation model corresponding to the first audio source to obtain the amplitude difference information and the phase difference information between the mixed audio signal and the first audio signal;

wherein the audio source separation model is obtained by training a plurality of training samples, each training sample comprises amplitude information of a sample mixed audio signal, and amplitude difference information and phase difference information between the sample mixed audio signal and a sample single audio source audio signal, and the sample single audio source audio signal is a single audio source audio signal corresponding to the first audio source in the sample mixed audio signal.

* * * * *